United States Patent
Cappellotto et al.

(10) Patent No.: US 8,182,047 B2
(45) Date of Patent: *May 22, 2012

(54) SPOKE FOR WIRE WHEELS, METHOD OF CONSTRUCTION OF SAID WHEEL AND WHEEL THUS OBTAINED

(75) Inventors: Guido Cappellotto, Arcore (IT); Fabio Alberio, Cinisello Balsamo (IT)

(73) Assignee: Alpina Raggi S.p.A., Lomagna (IT)

( * ) Notice: Subject to any disclaimer, the term of this patent is extended or adjusted under 35 U.S.C. 154(b) by 457 days.

This patent is subject to a terminal disclaimer.

(21) Appl. No.: 12/519,824

(22) PCT Filed: Dec. 19, 2007

(86) PCT No.: PCT/EP2007/064216
§ 371 (c)(1),
(2), (4) Date: Jun. 18, 2009

(87) PCT Pub. No.: WO2008/077860
PCT Pub. Date: Jul. 3, 2008

(65) Prior Publication Data
US 2010/0096907 A1    Apr. 22, 2010

(30) Foreign Application Priority Data
Dec. 22, 2006 (IT) .............................. PD2006A0471

(51) Int. Cl.
*B60B 21/06* (2006.01)

(52) U.S. Cl. ......................................... 301/58; 301/104
(58) Field of Classification Search ................... 301/55, 301/58, 104
See application file for complete search history.

(56) References Cited

U.S. PATENT DOCUMENTS

| | | | | |
|---|---|---|---|---|
| 6,666,525 | B1* | 12/2003 | Schroepfer | 301/80 |
| 7,744,165 | B2* | 6/2010 | Cappellotto | 301/58 |
| 8,033,617 | B2* | 10/2011 | Cappellotto et al. | 301/58 |
| 2002/0060494 | A1* | 5/2002 | Leo et al. | 301/67 |
| 2007/0057566 | A1 | 3/2007 | Cappellotto | |
| 2008/0036287 | A1* | 2/2008 | Alberio et al. | 301/58 |

FOREIGN PATENT DOCUMENTS

| | | |
|---|---|---|
| DE | 42 12 094 | 10/1993 |
| DE | 203 19 177 | 2/2004 |
| DE | 203 20 152 | 5/2004 |
| EP | 0 860 301 | 8/1998 |
| EP | 1 209 006 | 5/2002 |
| WO | WO 2005/058613 | 6/2005 |

* cited by examiner

*Primary Examiner* — Jason Bellinger
(74) *Attorney, Agent, or Firm* — Stradley Ronon Stevens & Young, LLP

(57) ABSTRACT

A spoke for a wire wheel of the type including a rim and a hub interconnected with one another by a plurality of spokes, each of which includes an end portion arranged to be retained at least in one direction in a seat associated with the rim. The spoke has a bush associated with the end portion for receiving same to define the seat. The bush is arranged to be inserted in a through-hole of the rim.

20 Claims, 3 Drawing Sheets

SPOKE FOR WIRE WHEELS, METHOD OF CONSTRUCTION OF SAID WHEEL AND WHEEL THUS OBTAINED

RELATED APPLICATIONS

This application is a U.S. national phase application of International Application No. PCT/EP2007/064216 filed on Dec. 19, 2007, which claims priority of Italian Patent Application No. PD2006A000471 filed on Dec. 22, 2006.

TECHNICAL FIELD OF THE INVENTION

The subject of the present invention is a spoke for a wire wheel of the type including a rim and a hub interconnected with one another by a plurality of spokes. The spoke has an end portion arranged to be retained at least in one direction in a seat associated with the rim. A bush is associated with the end portion for receiving same to define the seat. The bush is arranged to be inserted in a through-hole of the rim. Spokes including such characteristics are known from the production of Alpina Raggi S.p.A., the assignee of the present application, and from the following documents: DE 4212094A1, EP 0860301, WO 2005/058613, DE 20319177 U1, and DE 20320152 U1.

STATE OF THE ART

Recently, a marked interest has been shown in the market, in particular in the motorcycling sector, for wire wheels suitable for the fitting of tires without an inner tube (so-called tubeless tires). Such tires in fact have undoubted advantages of safety and lightness compared with conventional tires with an inner tube. They are therefore preferred for high speed use and for competitions.

However, the wheels suitable for such fitting present a problem, which is not easily solved, with regard to the need for a perfect air seal in the region of union between each spoke and the rim. The seal is complicated by the dynamic effects on the spoke inasmuch as the spoke is subjected to possible radial sliding, although of limited magnitude, relative to its mounting seat in the rim, owing to the localized deformation occurring on the rim under load.

Alpina Raggi S.p.A. has perfected a technical solution for mounting between rim and spokes which solves the aforesaid problem. This system is based on the fact that the end portion of the spoke, which is received in a through-hole in the rim (where a radial bulge towards the inside of the rim is customarily arranged) has a circumferential seal between its outer cylindrical wall and the wall of the hole such as to guarantee the air seal even in the presence of limited axial displacements of the spoke with respect to the rim. The axial displacements are also limited by a snap ring mounted on the end portion of the spoke (or nipple) outside the rim. However, some problems remain unsolved with regard to any drilling inaccuracies of the rim or variations in the thickness of same as a result of which interference could occur between the snap ring and the rim.

Typically, it is possible for a hole significantly misaligned with respect to the center of the bulge to impede the seating of the snap ring in its natural seat with the spoke (or nipple) fitted.

Moreover, the aforesaid technique requires accurate machining of the holes in the rim, and also optional prolongation of same by means of special processing (fusion bit). Taking into account the fact that any machining faults, even of a single hole, have an adverse effect on the sealing capacity of the entire wheel, it is clear that the construction of the wheel is tricky and subject to many critical factors.

SUMMARY OF THE INVENTION

The problem underlying the present invention is that of providing a spoke for wheels that is structurally and functionally designed so as to allow all the drawbacks mentioned with reference to the known devices cited to be remedied.

This problem is solved by the present invention through a specifically designed spoke. The spoke is part of a wire wheel including a rim and a hub interconnected with one another by the spoke, the rim having a through-hole. The spoke includes (a) an end portion arranged to be retained at least in one direction in the rim; and (b) a bush associated with the rim and defining a seat for receiving the end portion, the bush being arranged to be inserted in the through-hole of the rim. The end portion is air-tight received with a capability for a limited axial sliding in the seat of the bush.

The present invention also encompasses a wire wheel including a rim having a plurality of through-holes, a hub, and a plurality of spokes interconnecting the rim and the hub. Each spoke has (a) an end portion arranged to be retained at least in one direction in the rim, and (b) a bush being associated with the rim and defining a seat for receiving the end portion, the bush being arranged to be inserted in a corresponding through-hole of the rim, wherein the end portion is air-tight received with a capability for a limited axial sliding in the seat of the bush.

Advantageously, the invention allows pre-assembly of spokes and seats which must receive them in a sealed manner on the rim. In addition, the invention simplifies this assembly and makes it available without requiring complex equipment. This is achieved with the method of the present invention.

Specifically, the present invention also encompasses a method of constructing a wire wheel. The method includes providing a rim having a plurality of through-holes, providing a hub, and assembling the rim and the hub interconnected with one another by a plurality of spokes. Each spoke has (a) an end portion arranged to be retained at least in one direction in the rim, and (b) a bush being associated with the rim and defining a seat for receiving the end portion, the bush being arranged to be inserted in a corresponding through-hole of the rim, wherein the end portion is air-tight received with a capability for a limited axial sliding in the seat of the bush.

It is to be understood that both the foregoing general description and the following detailed description are exemplary, but are not restrictive, of the invention.

BRIEF DESCRIPTION OF THE DRAWINGS

The characteristics and advantages of the invention will become clearer from the following detailed description of preferred, but not exclusive, exemplary embodiments thereof, illustrated by way of non-limiting example with reference to the appended drawings, in which.

Figure 1:
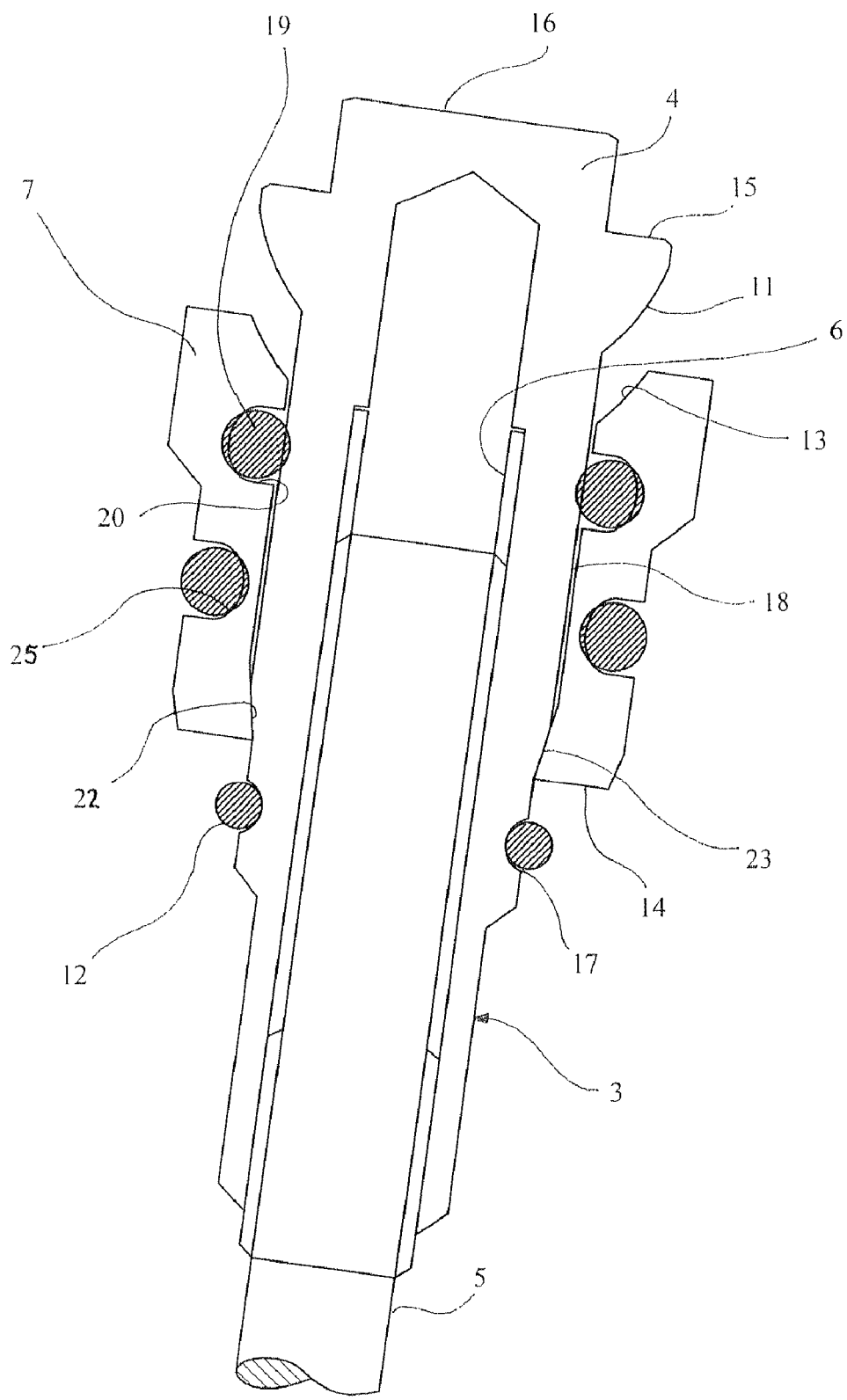
FIG. 1 is a view in longitudinal section of a spoke according to the present invention.

It is emphasized that, according to common practice, the various features of the drawings are not to scale. On the contrary, the dimensions of the various features are arbitrarily expanded or reduced for clarity.

PREFERRED EMBODIMENTS OF THE INVENTION

In the drawings, the reference 1 indicates as a whole a wire wheel of the type including a rim 2 and a hub (not shown) interconnected with one another by a plurality of spokes 3 produced according to the present invention. Each spoke 3 includes an end portion 4 which may be produced integrally with the spoke 3 itself, or separately from the spoke 3 (preferred example). When the end portion 4 is produced separately from the stem 5 of the spoke 3, the end portion 4 is screwed adjustably onto a threaded section of the stem 5 by means of a threaded blind hole 6 of the stem 5. In this second example, the end portion 4 of the spoke 3 is also designated by the term "nipple."

Figure 2:
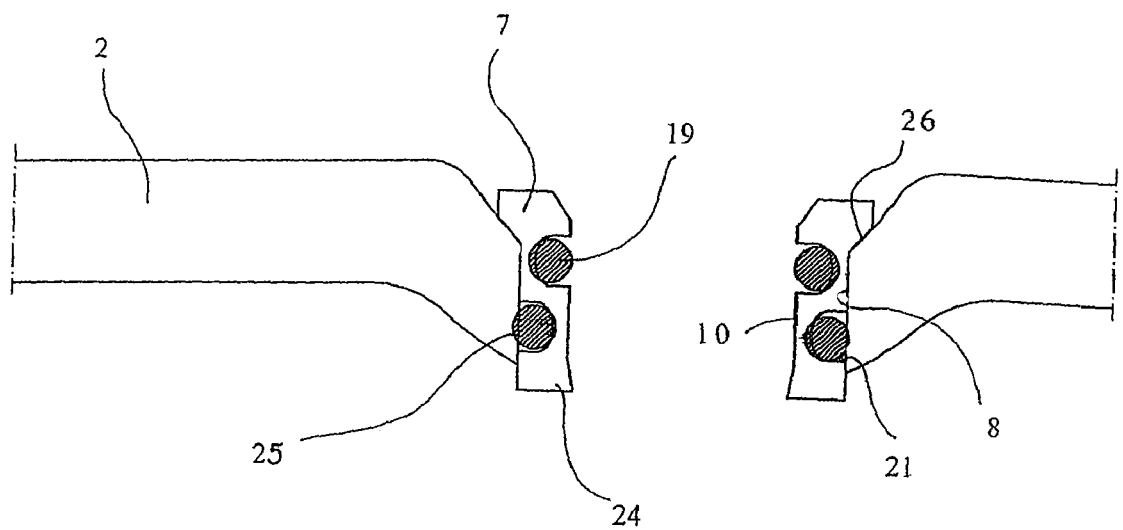
FIG. 2 is a sectional view of a rim in which is embedded a bush arranged to receive an end portion of the spoke of FIG. 1.
Figure 3:
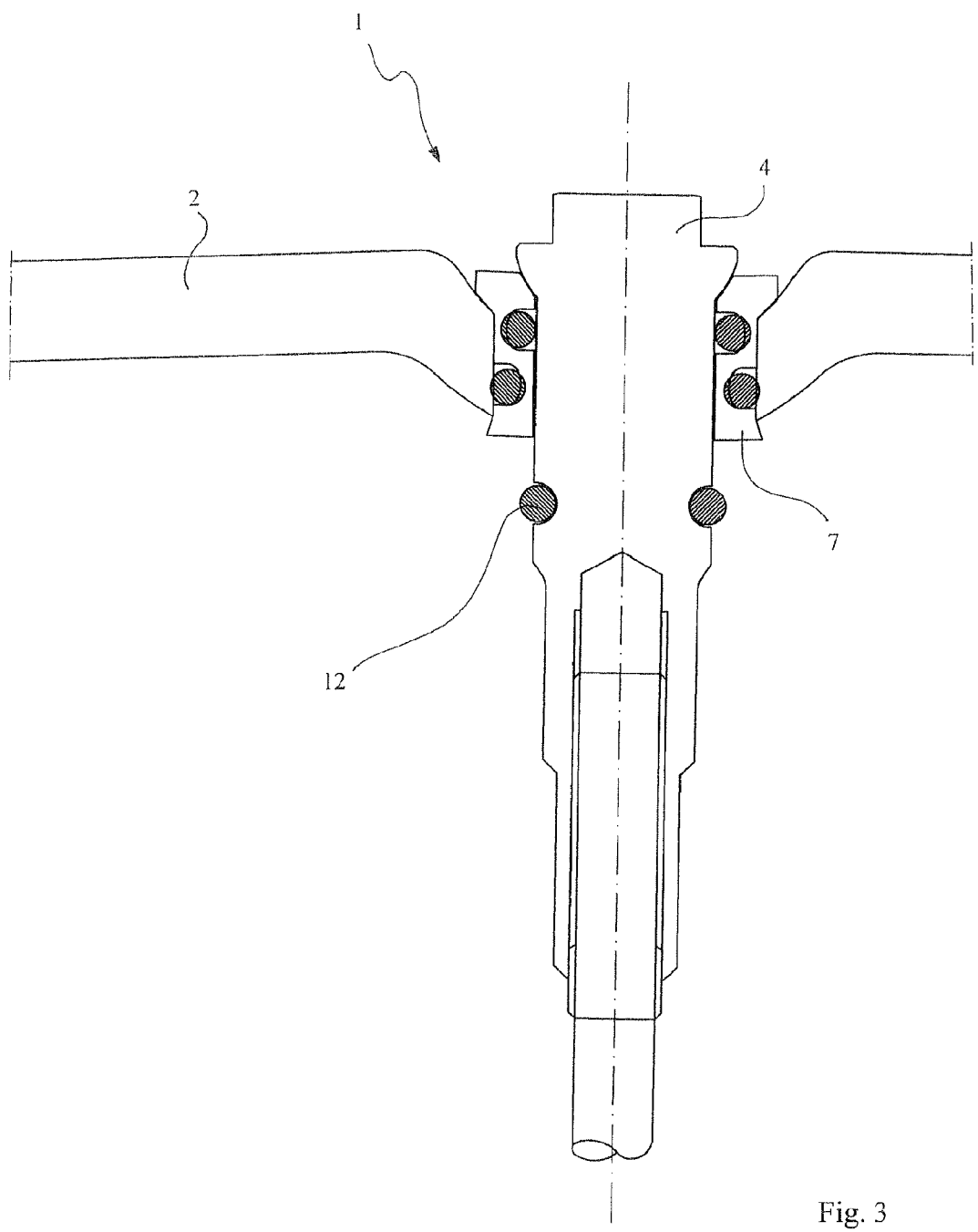
FIG. 3 is a sectional view of the assembled spoke and rim.

A bush 7 is arranged to be inserted (or embedded) in a through-hole 8 of the rim 2. The bush 7 is associated with the corresponding spoke 3 such that the bush 7 can be arranged directly on the end portion 4 (FIG. 1) or previously embedded in the rim 2 (FIG. 2) in order to arrange for the fitting of the spoke 3.

In the bush 7 a seat 10 is defined in which the end portion 4 of the spoke 3 is received with the capability of limited axial sliding between a first and a second shoulder 11, 12, axially spaced and capable of abutting against corresponding axially opposed first and second abutment surfaces 13, 14 on the bush 7. The first shoulder 11 is constituted by a hemispherical ball-type surface defined on a flange 15 located in proximity to an operating head 16 of the end portion 4; the second shoulder 12 is defined by a snap ring (Sieger ring) received in a corresponding annular depression 17 of the part of the end portion 4 nearest the stem 5.

The first abutment surface 13 is configured in a cup-shape to receive the ball-type configuration of the shoulder 11. The second abutment surface 14 is the opposed flat end face of the bush 7.

The distance between the first and second shoulders 11, 12 on the end portion 4 is greater than the distance between the first and second abutment surfaces 13, 14 on the bush 7 so that the end portion 4 can move axially in the bush 7 in the event of deformation of the rim 2. In this way, deformations or breakages in the corresponding spoke 3 under dynamic load are avoided.

Between the bush 7 and a section 18 of cylindrical wall of the end portion 4 a sealing gasket 19 of the O-ring type is interposed, preferably received in an annular depression 20 of the bush 7. The gasket 19 may also be received in a depression on the end portion 4. Between the bush 7 and the corresponding through-hole 8 in the rim 2 a second gasket 25 is interposed, received in a depression 21 of the bush 7. In this way a complete air seal is produced between spoke 3, bush 7, and rim 2.

The bush 7 also has in proximity to the second abutment surface 14 a tapered (conical) section 22 capable of co-operating with a corresponding conical section 23 of the end portion 4 in order to deform radially a lip 24 of the bush 7 and facilitate the retention thereof in the through-hole 8. Provision is also made for the bush 7 to be retained otherwise in the through-hole 8 by forcing, adhesive securing, mechanical deforming, rivetting, screwing or by some other mechanism.

On the opposite side from the lip 24 the bush 7 has a collar 26 such that, once embedded in the rim 2, the bush 7 is held in two directions.

In order to construct a wire wheel 1 according to the invention, a rim 2 and a hub (not shown) are interconnected with one another by a plurality of spokes 3 as indicated above. The bushes 7 may be pre-assembled on the end portions 4 of the spoke 3 or slipped separately into the through-holes 8 of the rim 2. The bushes 7 are then locked in the through-holes 8 in the rim 2 by plastic deformation of the lip 24. This deformation may be brought about by screwing the end portion 4 onto the stem 5 of the spoke 3 so that, as a result of the traction exerted, the deformation mechanism and complementary mechanism constituted by the conical sections 22, 23, by interfering with one another, cause the lip 24 to be deformed radially towards the outside, thus locking the bush 7.

The invention described solves the problem posed, obtaining numerous advantages, including that of permitting greater tolerances in the machining of the through-holes 8 on the rim 2, both as far as the positioning of each through-hole 8 with respect to the corresponding bulge on the rim 2 is concerned, and as far as the dimensions of the through-hole 8 itself are concerned. Furthermore, prolongation by using special processing, of the through-holes 8 to be made, is not required.

The present invention therefore solves the problems mentioned above with respect to the known devices cited.

Although illustrated and described above with reference to certain specific embodiments and examples, the present invention is nevertheless not intended to be limited to the details shown. Rather, various modifications may be made in the details within the scope and range of equivalents of the claims and without departing from the spirit of the invention.

The invention claimed is:

1. A spoke for a wire wheel including a rim and a hub interconnected with one another by a spoke, the rim having a through-hole and the spoke having a longitudinal axis and comprising:
    an end portion arranged to be retained at least in one direction in the rim;
    a bush being associated with the rim and defining a seat for receiving the end portion, the bush being arranged to be inserted in the through-hole of the rim; and
    a first sealing gasket disposed between the bush and the end portion creating an air-tight seal between the end portion and the bush,
    wherein the end portion is capable of limited sliding along the longitudinal axis in the seat of the bush.

2. The spoke according to claim 1, further comprising a stem wherein the end portion is connected to the stem of the spoke to constitute a nipple.

3. The spoke according to claim 2, wherein the bush comprises a second sealing gasket for sealing the bush against the through-hole of the rim.

4. The spoke according to claim 3, further comprising means for retaining the bush sealingly in the through-hole.

5. The spoke according to claim 1, wherein the end portion comprises means for limiting the sliding of the end portion in the seat of the bush along the longitudinal axis both toward the hub and away from the hub.

6. The spoke according to claim 5, wherein the bush has opposed abutment surfaces and the limiting means comprises a first and a second shoulder on the end portion, the shoulders being spaced along the longitudinal axis from each other and capable of abutting against the corresponding opposed abutment surfaces on the bush.

7. The spoke according to claim 6, wherein the distance between the first and second shoulders on the end portion is greater than the distance between the abutment surfaces on the bush.

8. The spoke according to claim 4, wherein the retaining means comprises a tapered section on the bush and a conical section on the end portion deforming the bush in order to retain the bush in the seated position in the corresponding through-hole of the rim.

9. The spoke according to claim 8, wherein the bush has a lip, and the tapered section and the conical section co-operate to deform the lip away from the end portion and retain the bush in the through-hole of the rim.

10. A method of construction of a wire wheel comprising:
providing a rim having a plurality of through-holes;
providing a hub; and
assembling the rim and the hub interconnected with one another by a plurality of spokes, each spoke having (a) a longitudinal axis, (b) an end portion arranged to be retained at least in one direction in the rim, (c) a bush being associated with the rim and defining a seat for receiving the end portion, and (d) a first sealing gasket disposed between the bush and the end portion creating an air-tight seal between the end portion and the bush, the bush being arranged to be inserted in a corresponding through-hole of the rim, wherein the end portion is capable of limited sliding along the longitudinal axis in the seat of the bush.

11. The method according to claim 10, wherein the bushes are inserted on the rim prior to coupling between the rim and the spokes.

12. The method according to claim 10, wherein the bushes are pre-assembled on the respective end portions of the respective spokes and are transferred onto the rim in a seat for assembly between the rim and the spokes.

13. The method according to claim 12, wherein the bushes are locked in the through-holes in the rim by plastic deformation of a lip at an end of the bushes opposed to a collar.

14. The method according to claim 13, wherein the deformation is obtained as a result of the interference between the bush and the end portion of the spoke at respective facing and interfering conical sections on the bush and the end portion.

15. A wire wheel constructed according to the method of claim 10.

16. A wire wheel comprising:
a rim having a plurality of through-holes;
a hub; and
a plurality of spokes interconnecting the rim and the hub, each spoke having (a) a longitudinal axis, (b) an end portion arranged to be retained at least in one direction in the rim, (c) a bush being associated with the rim and defining a seat for receiving the end portion, and (d) a first sealing gasket disposed between the bush and the end portion creating an air-tight seal between the end portion and the bush, the bush being arranged to be inserted in a corresponding through-hole of the rim, wherein the end portion is capable of limited sliding along the longitudinal axis in the seat of the bush.

17. The wire wheel according to claim 16, wherein the bush has a second sealing gasket for sealing against the through-hole.

18. The wire wheel according to claim 16, wherein the bush has opposed abutment surfaces and the end portion has a first and a second shoulder, the shoulders being spaced along the longitudinal axis from each other and capable of abutting against the corresponding opposed abutment surfaces on the bush for limiting the sliding of the end portion in the seat of the bush along the longitudinal axis and both toward the hub and away from the hub.

19. The wire wheel according to claim 16, wherein the bush has a lip at an end of the bush opposed to a collar and the bush is locked in the corresponding through-hole in the rim by plastic deformation of the lip.

20. The wire wheel according to claim 19, wherein the bush and the end portion have respective facing and interfering conical sections and interference between these sections deforms the lip.

* * * * *